(12) United States Patent
Kress et al.

(10) Patent No.: US 6,913,428 B2
(45) Date of Patent: Jul. 5, 2005

(54) TOOL FOR THE PRECISION MACHINING OF SURFACES

(75) Inventors: Dieter Kress, Aalen (DE); Friedrich Häberle, Lauchheim (DE)

(73) Assignee: Mapal Fabrik fur Prazisionswerkzeuge Dr. Kress KG (DE)

( * ) Notice: Subject to any disclaimer, the term of this patent is extended or adjusted under 35 U.S.C. 154(b) by 237 days.

(21) Appl. No.: 10/309,655

(22) Filed: Dec. 4, 2002

(65) Prior Publication Data

US 2003/0103821 A1 Jun. 5, 2003

(30) Foreign Application Priority Data

Dec. 4, 2001 (DE) .......................... 101 59 431

(51) Int. Cl.[7] .............................................. B23B 51/00
(52) U.S. Cl. .................. 408/144; 408/145; 408/83; 408/224; 408/227; 408/713
(58) Field of Search .................. 408/144, 145, 408/83, 223, 224, 225, 227, 713, 57, 59

(56) References Cited

U.S. PATENT DOCUMENTS

| | | | | |
|---|---|---|---|---|
| 748,890 A | * | 1/1904 | Taylor et al | 408/224 |
| 1,460,029 A | * | 6/1923 | Mattson | 407/41 |
| 2,063,753 A | * | 12/1936 | Pohlman | 408/229 |
| 2,479,136 A | | 8/1949 | Schade | 77/72 |
| 2,630,725 A | * | 3/1953 | Black | 408/224 |
| 5,178,497 A | * | 1/1993 | Kitabayashi et al. | 408/145 |
| 5,191,864 A | * | 3/1993 | Santi | 123/193.2 |
| 5,516,243 A | * | 5/1996 | Laube | 408/239 R |
| 5,655,860 A | * | 8/1997 | Oles | 409/132 |
| 6,033,159 A | * | 3/2000 | Kress et al. | 408/83 |
| 6,254,319 B1 | * | 7/2001 | Maier et al. | 408/57 |
| 6,575,672 B1 | * | 6/2003 | Maier | 408/59 |
| 2003/0133763 A1 | * | 7/2003 | Kuroda et al. | 407/40 |

FOREIGN PATENT DOCUMENTS

| | | | |
|---|---|---|---|
| DE | 385524 | | 11/1923 |
| DE | 2317568 | * | 10/1974 |
| DE | 39 09 643 A1 | | 9/1990 |
| DE | 4341503 | | 6/1995 |
| DE | 19621295 | | 11/1997 |
| EP | 0157 114 A2 | | 2/1985 |
| JP | 58-45804 | * | 3/1983 |
| JP | 58-45805 | * | 3/1983 |
| JP | 4-310303 | * | 11/1992 ................ 408/144 |
| JP | 2003-11014 | * | 1/2003 |

OTHER PUBLICATIONS

European Search Report dated Apr. 25, 2003.
Dieter Kress, "Hartbearbeitung ersetzt Schleifen", *Werkzeuge I WB*, Jahrg. 133 (2000) 7–8, pp. 31–33. (Complete English language translation is included).

* cited by examiner

*Primary Examiner*—Daniel W. Howell
(74) *Attorney, Agent, or Firm*—Ostrolenk, Faber, Gerb & Soffen, LLP

(57) ABSTRACT

A tool for the precision machining of surfaces in workpieces comprising at least two cutter inserts in the periphery of the tool body and each having at least one defined cutting edge. The cutter inserts are of different materials at least in the region of the at least one cutting edge. Guide strips on the tool body periphery between the cutter inserts guide the tool body.

39 Claims, 3 Drawing Sheets

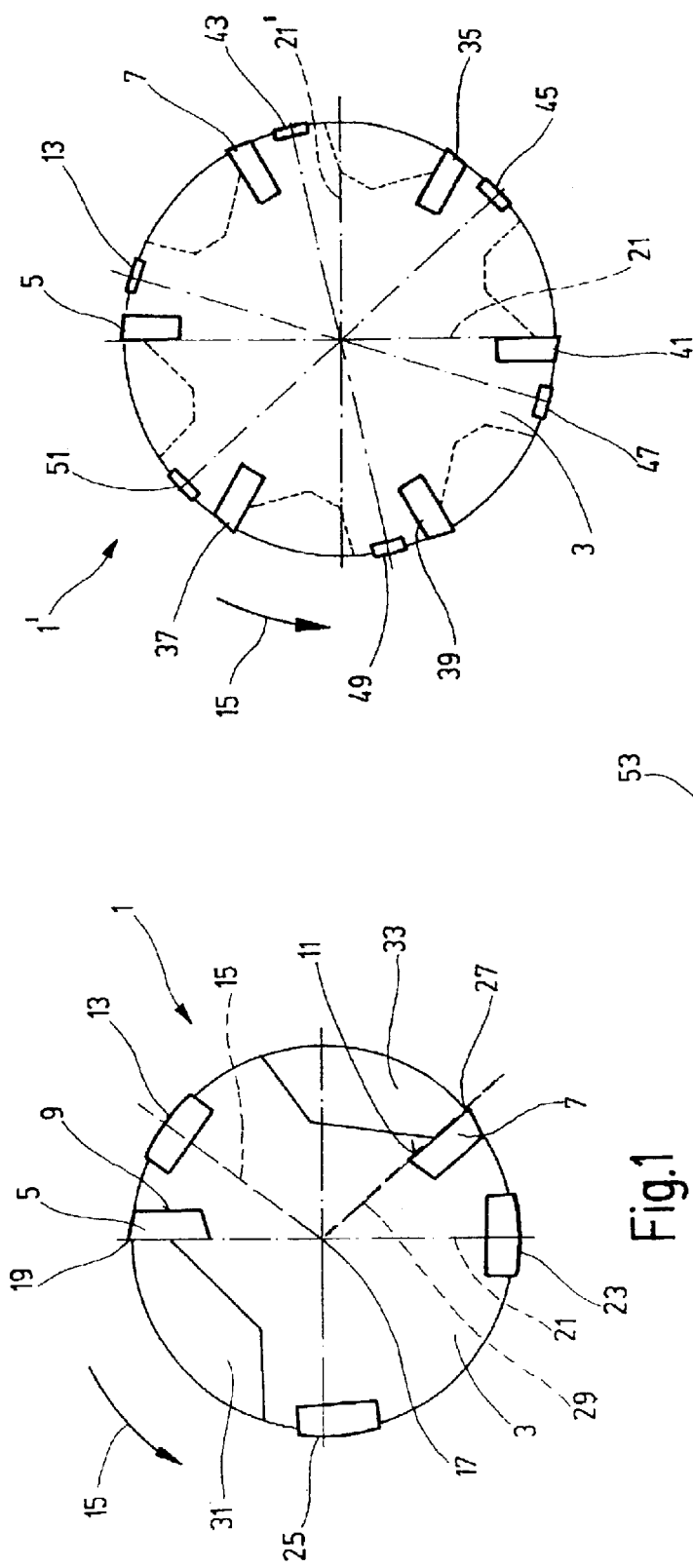

TOOL FOR THE PRECISION MACHINING OF SURFACES

BACKGROUND OF THE INVENTION

The invention relates to a tool for precision machining of surfaces in workpieces, particularly surfaces of more or less cylindrical recesses, such as bores. Such surfaces are usually machined by rotating the tool and moving it into the opening to be machined in the stationary workpiece. In principle, however, it is also possible to rotate the workpiece while holding the tool stationary. Only relative rotary or feed movement between the tool and the workpiece is relevant. The normal case, in which the tool rotates and the workpiece is stationary, is described below.

The tool has geometrically determined cutting edges which are preferably provided on cutter inserts. The inserts remove chips from the workpiece during the machining of the surfaces. To achieve very good surface quality, additional processes are usually used after the machining, for example honing or roller-burnishing. This produces surfaces with an arithmetic average roughness value of Ra=0.1 $\mu$m. Due to the additional working steps, the precision machining of surfaces is time-consuming and costly.

SUMMARY OF THE INVENTION

The object of the invention is therefore to provide a tool with which precision-machined surfaces can be achieved quickly and in a cost-effective manner.

To achieve this object, a tool according to the invention has a tool body that supports at least two cutter inserts, each having at least one defined, that is geometrically determined, cutting edge. The cutter inserts are comprised of different materials at least in the region of their cutting edges. The materials of the cutter inserts can be matched especially effectively to the methods of machining the surfaces of the workpiece. Thus, preliminary machining may be done by one cutting edge and precision machining by another cutting edge and the materials used for the cutting edges or cutter inserts may be matched to the machining methods such that surfaces are produced with such low enough roughness that additional machining steps may be avoided.

In one embodiment, the cutter insert for preliminary machining has carbide, cermet and/or CBN (cubic boron nitride) at least in the region of its cutting edge, and the cutting edge or cutter insert for the precision machining has PCD (polycrystalline diamond). This material combination for the cutter inserts produces especially good values for the surface roughness.

In a preferred embodiment, the radius of the pitch circle of the cutter insert which is for precision machining differs by only a few micrometers ($\mu$m) from the radius of the pitch circle of the cutter insert for preliminary machining. The cutter insert for precision machining projects only slightly beyond that for the preliminary machining. This produces a very small cutting depth and thus causes the lowest possible heating of the active cutting edge of the cutter insert for the finish or precision machining.

Also preferred is an embodiment of a tool having a coolant and/or lubricant supply. The latter may be designed in such a way that in particular the cutter insert or cutting edge which has PCD is cooled especially effectively. It is thus possible to set a maximum temperature of 500° C. in the region of the PCD cutting edge, so that, even when using PCD, long tool life can be achieved when machining cast materials or steel materials, to ensure a high surface quality.

BRIEF DESCRIPTION OF THE DRAWINGS

The invention is explained in more detail below with reference to the drawing, in which:

FIG. 1 is a diagrammatic sketch of a first embodiment of a tool in plan view;

FIG. 2 is a diagrammatic sketch of a second embodiment in plan view;

FIG. 3 is a diagrammatic sketch of the tool, in which two cutter inserts and a guide strip are projected approximately into one plane;

DESCRIPTION OF PREFERRED EMBODIMENTS

Figure 4:
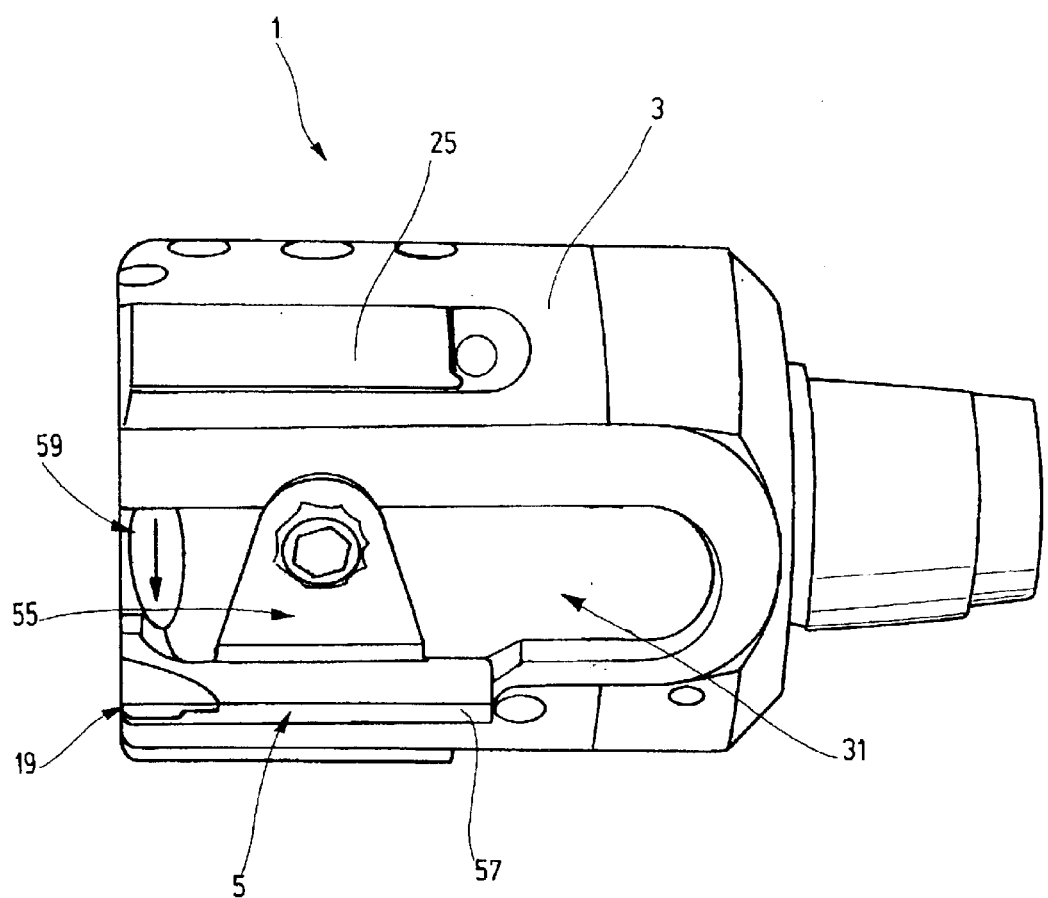
FIG. 4 is a perspective view of the tool in FIG. 1.

The tool 1 in FIG. 1 is an example of a two-edged cutter. It has two cutter inserts 5 and 7 which are fastened to the main body 3 of the tool 1 by being inserted into radial grooves 9 and 11 in the main body 3. The cutter inserts 5, 7 are fastened to the body 3 in a conventional manner, usually by clamping shoes. It is also possible to clamp them in place directly on the tool 1 with screws.

At least one guide strip is inserted into the main body 3. A first guide strip 13, viewed in the direction of rotation 15 of the tool 1, is positioned behind the first cutter insert 5 by about 40°. A line 15 radially through the center of the guide strip 13 intersects the center axis or rotation axis 17 of the tool 1 and encloses an angle of about 40° with a diametral line 21 through the cutting edge 19 of the first cutter insert 5.

A second guide strip 23 is positioned opposite the first cutter insert 5. Finally, a third guide strip 25 is inserted into the main body 3 of the tool 1, viewed in the direction of rotation 15 of the tool 1, about 90° ahead of the first cutter insert 5.

The second cutter insert 7 is inserted into the main body 3 of the tool 1, in the direction of rotation 15 of the tool 1, about 40° ahead of the second guide strip 23. A line 29 through the cutting edge 27 of the second cutter insert 7 intersects the rotation axis 17 and encloses an angle of about 40° with the diametral line 21.

A recess in the main body 3 is formed in front of each cutter insert 5 and 7 in the direction of rotation. The recesses are conventional chip spaces 31 and 33 for the cutting edges 19, 27 respectively, to receive the chips of the workpiece which are removed by the cutting edges 19 and 27.

During machining of a workpiece, as explained above, the tool 1 in FIG. 1 is set in counterclockwise direction rotation for machining a surface, in particular a bore surface, of the workpiece, as indicated by the arrow 15. The rotating tool 1 is then directed into the bore to be machined (feed movement). The cutter inserts 5 and 7 remove chips from the bore surface, while the tool 1 is supported at its outer peripheral surface by the guide strips 13, 23 and 25. The cutting edges 19 and 27 of the cutter inserts 5 and 7 each lie on a respective imaginary circle, the "pitch circle". The radius of the pitch circle of the first cutter insert 5 is larger than that radius of the second cutter insert 7. Only the cutting edge 19 (finish cutting edge) of the cutter insert 5 projects beyond the pitch circle of the outer surface of the guide strips 13, 23 and 25, which are thus set back radially relative to the cutting edge 19.

This causes the second cutter insert 7 to provide rough machining, that is preliminary machining, of the workpiece surface, while the cutting edge 19 of the first cutter insert 5 provides finish machining, that is the precision/fine machining.

The cutter inserts 5 and 7 are radially offset so that the first cutter insert 5 "micromachines", that is it removes chips having a thickness of a few $\frac{1}{100}$ mm.

FIG. 2 shows a second embodiment of the tool 1', which is a six-edged cutter having six cutter inserts. This enables higher feed speeds. The second cutter insert 7 is arranged together with the first cutter insert 5 in the first quadrant, which is formed by the two perpendicular diametral lines 21 and 21'. A third cutter insert 35, located in the fourth quadrant below the second cutter insert 7, like the first cutter insert 5, is for fine machining of the workpiece surface. A fourth cutter insert 37, located opposite the third cutter insert 35, is for preliminary machining. A fifth cutter insert 39 inserted into the main body 3 of the tool 1' opposite the second cutter insert 7 is for preliminary machining. Finally, a sixth cutter insert 41 for preliminary machining of the workpiece surface is provided opposite the first cutter insert 5.

The tool 1' has two cutter inserts, the first 5 and third 35 inserts, for fine machining, whereas the remaining cutter inserts, second 7, fourth 37, fifth 39, and sixth 41 cutter inserts are for preliminary machining of the workpiece surface.

The fourth cutter insert 37 is ahead of the first cutter insert 5 in the rotation direction of tool 1' by about 60°. The fifth cutter insert 39 is ahead of the first cutter insert 5 by about 120°. The sixth cutter insert 41 is ahead of the first cutter insert 5 by about 180°. The second cutter insert 7 follows the first cutter insert 5 by about 60° in the rotation direction of tool 1' and is ahead of the third cutter insert 35 by about 60°.

The tool 1' therefore has two pairs, each comprised of one cutter insert for finish machining and one cutter insert for preliminary machining and has one pair which consists of two cutter inserts for preliminary machining.

Therefore, the cutter inserts are each located opposite one another in pairs.

The tool 1' has a first guide strip 13 following the first cutter insert 5 by about 20°. Guide strips 43, 45, 47, 49, 51 follow respective further cutter inserts by about 20°.

During machining of a workpiece surface, the tool 1 bears against the workpiece surface first with the cutter inserts and then with the guide strips. The cutting edges of the cutter inserts and the surfaces of the guide strips lie on imaginary pitch circles. The cutter inserts for preliminary machining, that is, the second 7, fourth 37, fifth 39 and sixth 41 cutter inserts, are on a pitch circle with a radius which is smaller than the radius of the pitch circle on which the cutter inserts serving for the fine machining lie, that is the first 5 and the third 35 cutter inserts. The pitch circle of the guide strips 43 to 51 is larger than that of the cutter inserts for preliminary machining.

The resulting radial projection of the fine machining cutter inserts beyond the cutter inserts serving for preliminary machining is very small, so that the fine machining cutter inserts remove very thin chips, e.g. a few $\frac{1}{100}$ mm, enabling micromachining.

FIG. 3 is a diagrammatic sketch of an example in which the first cutter insert 5, the second cutter insert 7 and the guide strip 13 have been rotated into one plane. This illustrates the radial offset of the cutter inserts relative to one another and relative to the guide strip, and the offset of these elements from one another in the feed direction, that is in the direction of the rotation axis 17 of the tool 1 or 1', is seen.

FIG. 3 shows that the second preliminary machining cutter insert 7 is ahead of the first cutter insert 5 and the guide strip 13 in the feed direction of the arrow 53. FIG. 3 also shows that the guide strip 13 follows both of cutter inserts 5 and 7 in the direction of the arrow 53, so that the strip 13 is the last to engage the workpiece surface to be machined when the tool 1 or 1' is fed in.

In FIG. 3, the preliminary machining cutter insert 7 is set back radially relative to the first fine machining cutter insert 5. The guide strip 13 is also set back radially slightly relative to the cutter insert 5, although to a lesser extent than the second cutter insert 7. Thus, the strip 13 virtually forms the outer periphery of the tool 1 or 1', at least with the remaining guide strips. In the tool 1 in FIG. 1, the second cutting edge 7 is set back radially relative to the associated second guide strip 23 by about 12 $\mu$m to 15 $\mu$m. The first cutter insert 5 projects radially relative to the associated first guide strip 13 by 9 $\mu$m to 12 $\mu$m. This assures micromachining particularly in the region of the first cutter insert 5.

In FIG. 1, the first cutting edge 19 is ahead of the associated guide strip 13 by 0.20 mm to 0.25 mm in the feed direction of the tool. The second cutting edge is preferably ahead of the associated guide strip by about 0.50 mm in the feed direction of arrow 53.

In the tools of FIGS. 1 and 2, the cutter inserts for fine machining, that is the first cutter insert 5 and the third cutter insert 35, or at least their cutting edges, are made of a different material from the remaining cutter inserts for preliminary machining, or at least their cutting edges. The second cutter insert 7 in FIGS. 1 and 2 and the fourth, fifth and sixth the cutter inserts 37, 39 and 41 in FIG. 2, are for preliminary machining. Carbides, cermet, that is a carbide which mainly consists of titanium carbide or titanium nitride, or of both, are used for the preliminary machining. CBN is also suitable. PCD is used for the finish machining.

The different materials of the cutter inserts or cutting edges for fine and preliminary machining enables optimally matching the materials for the respective types of machining and the workpiece material. Excellent surface quality can be achieved without need for additional machining steps.

The material selection made here has proved especially successful during the machining of workpieces of cast materials, in particular gray cast iron and/or steel.

The tools of FIGS. 1 and 2 have a coolant and/or lubricant supply, shown as to FIGS. 4 and 5, to reduce the friction of the tool inside the machined bore, and also to cool the active cutting edges of the cutter inserts, which engage the workpiece surface. The coolant and/or lubricant supply is designed such that the active cutting edge of PCD is so intensively cooled that its temperature as far as possible lies below 600° C. From about 600° C., decomposition or structural transformation of the carbon takes place at the PCD cutting edge. During the "graphitization", the structure of the diamond is transformed into a graphite structure, which has very adverse effects with regard to the stability of the cutting edge. Cooling has proved successful and is effective to produce a temperature of 400° C. to 600° C., in particular about 450° C. to 550° C. It is especially preferred that cooling of the active cutting edge(s) consisting of PCD causes the edges to reach at most a working temperature of 500° C. This design of a coolant and/or lubricant feed enables PCD cutting edges or PCD cutter inserts, which are normally used for cutting aluminum and nonferrous metals, to also be used for cutting cast iron and/or steel.

During machining of a workpiece, even if the workpiece is made of cast iron and/or steel, the temperature in the region of the active cutting edge which consists of PCD should be limited to preferably 500° C. at most. This temperature may be achieved by appropriately adapting the feed and rotary speeds of the tool and by appropriate cooling. To this end, a jet of coolant can also be directed straight onto the fine machining cutting edge and/or onto the region ahead of the cutting edge of PCD. Excessive heating in the region of the PCD cutting edge is also avoided by that cutting edge working with a very small cutting depth of a few 1/100 mm, that is, it is merely used for micromachining. This prevents the temperature from increasing to an excessive degree.

Ultimately, it has been found that, when this tool is used, PCD is very suitable as a cutting-edge or cutter-insert material and a surface quality of Ra=0.10 μm can be achieved. In addition, the low cutting-edge temperature which is achieved here causes a relatively long tool life because the wear on the PCD cutting edge is especially low.

Two-edged and six-edged cutting tools have been explained. Also possible are tools with, for example, four cutting edges, of which three edges are for preliminary machining and one edge is for fine machining. Irrespective of the number of cutting edges, the preliminary or rough machining is carried out with carbide and the like, whereas the precision or fine machining is carried out with at least one PCD cutting edge. The micromachining and the special cooling prevent the PCD cutting edge(s) from being heated to such an excessive degree that the PCD transforms into carbon.

The cutter inserts may all be indexable inserts, with more than one cutting edge. After one of the cutting edges has become worn, the indexable insert is turned so that a further cutting edge may be brought into engagement with the workpiece surface to be machined.

A coolant and/or lubricant supply, described above, is explained with reference to FIGS. 4, 5A and 5B, which each show a perspective representation of the exemplary embodiment of the tool 1 in FIG. 1. Corresponding parts have the same designations as in the descriptions of FIGS. 1 to 3.

In FIG. 4, the first cutter insert 5 is held on the main body 3 by a known clamping shoe 55. In this exemplary embodiment, the first cutter insert 5 comprises a cutting-edge main body 57 with a cutting edge 19 of PCD. The clamping shoe 55 acts on the cutting-edge main body 57.

Figure 5A:
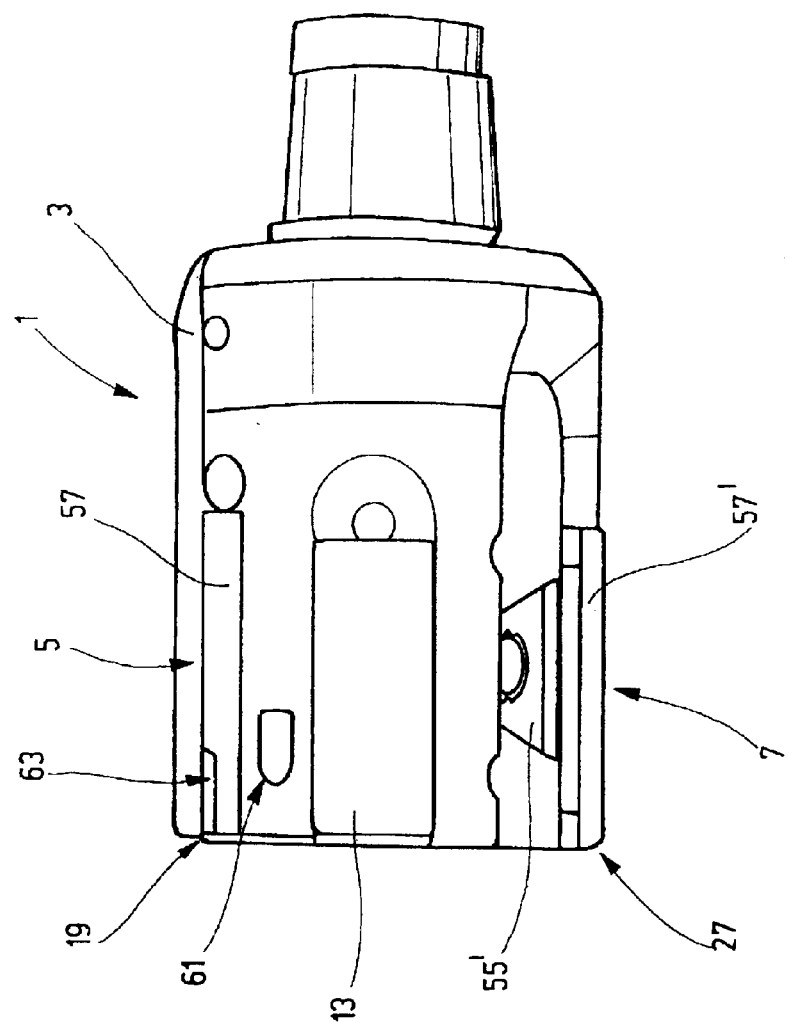
FIGS. 5A and 5B each show a further perspective view of the tool in FIG. 1.

A first coolant and/or lubricant discharge opening 59 passes a pressurized coolant and/or lubricant. The first discharge opening 59 is arranged and formed on the main body 3 so that the coolant/lubricant jet (not shown) discharged from the first discharge opening 59 directly strikes the PCD cutting edge 19 of the first cutter insert 5, to intensively cool the active PCD cutting edge 19. In this embodiment, the coolant/lubricant jet discharging from the first discharge opening 59 has virtually no directional component running with or against the feed movement. This configuration and arrangement of the first discharge opening 59, cools the main and the secondary cutting edges on the rake face, and at the cutting edge itself, the flanks of the cutting edge 19 are cooled to a lesser extent. In order to achieve effective cooling there too, a further, FIG. 5A shows second coolant and/or lubricant discharge opening 61 which may be provided in the tool 1 directly following the cutting edge 19, as viewed in the rotation direction of the tool 1. The second coolant/lubricant discharge opening 61 is arranged between the first cutter insert 5 and the following guide strip 13. The second discharge opening 61 is arranged so that the coolant/lubricant jet discharged therefrom is directed for a flow onto the flanks 63 of the cutting edge 19 of the first cutter insert 5. When the tool 1 is located in the bore, the guide strip 13, the flanks 63, the bore surface and parts of the surface of the tool 1 form a passage to which the coolant/lubricant can be admitted through the discharge opening 61. The coolant/lubricant used therefore can escape only in the axial direction of the tool 1. This likewise produces an optimum flow around and thus cooling of the flanks 63 of the cutting edge 19. In the direction of rotation 15, the coolant/lubricant is virtually pushed by the guide strip 13 in the direction of the cutting edge 19.

Figure 5B:
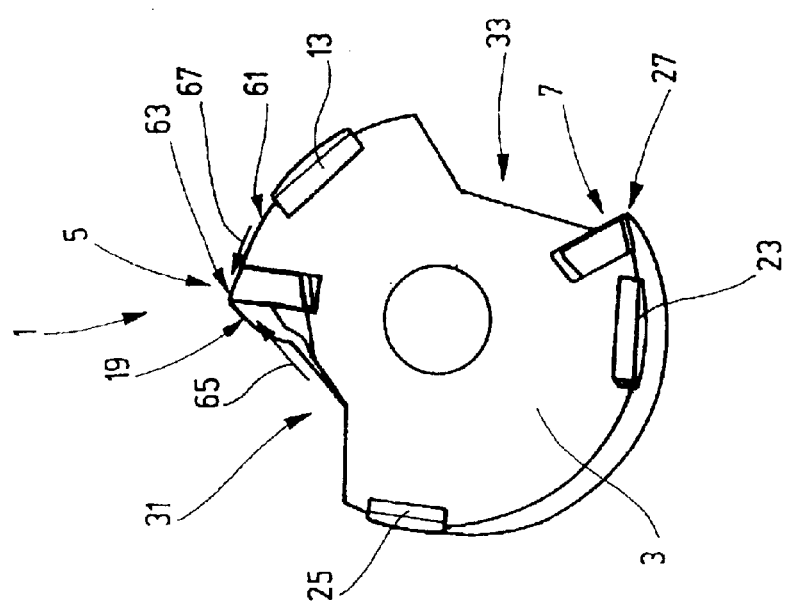

In FIG. 5B, which shows a front view of the tool 1, coolant/lubricant is admitted to the first cutter insert 5 or the cutting edge 19 from two circumferential direction sides, wherein the coolant/lubricant jet 65 from the first discharge opening 59 is directed essentially against the rotation direction 15 of the tool 1, while the coolant/lubricant jet 67 from the second discharge opening 61 is directed essentially in the direction of rotation 15.

To ensure sufficient cooling or lubrication of the PCD cutting edge 19 of the cutter insert 5, so that it is preferably not heated above 500° C., one of the first discharge opening 59 or the second discharge opening 61 may be sufficient. It is also possible for more than two discharge openings for coolant and/or lubricant to be assigned to the first cutter insert 5 or the cutting edge 19. In a further variant embodiment not shown, at least one discharge opening for the coolant and/or lubricant is also assigned to the second cutter insert 7. Otherwise, at least one, but preferably two coolant and/or lubricant jets is admitted particularly to the cutter inserts 5 and 35 for fine machining, but also are admitted to the remaining cutter inserts or the cutting edges of the cutter inserts.

In FIG. 5A, the second cutter insert 7 also has a cutting-edge main body 57' and is held in the main body 3 of the tool 1 by a clamping shoe 55'. Here, the cutting edge 27 of the second cutter insert 7 is of one piece with the cutting-edge main body 57', that is, the cutting edge 27 is made, for example ground, from the cutting-edge parent body 57' preferably consisting of carbide, cermet and/or CBN. Of course, the cutting edge 27 may be made of a different material from the cutting-edge main body 57' and may be fastened to the body in a suitable manner.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool for precise machining of a surface of a bore in a work piece, the tool comprising:
    a main body with a periphery;
    a first and a second cutter insert supported at the periphery of the main body, the first and second inserts each being shaped to define at least a respective first cutting edge of the first cutter insert and a second cutting edge of the second cutter insert at the main body for machining the bore surface; the first and second cutter inserts being comprised of respective different first and second materials at least in the region of the at least one first cutting edge and second cutting edge;
    at least one guide strip provided in the main body for engaging the bore for guiding the positioning of the tool as the tool is rotated; the guide strip being behind the at least one of the first and second cutter inserts in the feed direction of the tool;
    the at least one guide strip, comprises a second strip at the periphery of the main body and located around the main body opposite the first cutter insert; and
    the at least one guide strip further comprises a third guide strip at the periphery of the main body and ahead of the first cutter insert by about 90° in the feed direction of the tool.

2. The tool of claim 1, wherein the respective materials of the first and second cutting edges of the first and second inserts are selected so that the second cutting edge is adapted for rough machining of the bore of the workpiece and the first cutting edge is adapted for fine machining of the bore of the workpiece.

3. The tool of claim 1, wherein the cutter inserts are positioned so that the first cutting edge of the first cutter insert projects further beyond the periphery of the main body than the second cutting edge of the second cutter insert.

4. The tool of claim 3, wherein the tool has a longitudinal direction along an axis of the tool and the first cutter insert is offset from the second cutter insert along the longitudinal direction.

5. The tool of claim 1, wherein the tool has a longitudinal direction along an axis of the tool and the first cutter insert is offset from the second cutter insert along the longitudinal direction.

6. The tool of claim 3, wherein the first cutter insert has PCD in a region of the at least one first cutting edge.

7. The tool of claim 3, wherein the first cutter insert edge is of a material selected for finished machining of the bore.

8. The tool of claim 6, wherein the material of the first cutting edge of the first cutter insert is PCD.

9. The tool of claim 8, wherein the second cutter insert has at least one of carbide, cermet and CBN at least in the region of the at least one second cutting edge thereof.

10. The tool of claim 3, wherein the second cutter insert has at least one of carbide, cermet and CBN at least in the region of the at least one second cutting edge thereof.

11. The tool of claim 7, wherein the second cutter insert has a material that is for preliminary machining of the bore.

12. The tool of claim 11, wherein the first cutter insert is behind the second cutter insert in the feed direction of the tool.

13. A tool for precise machining of a surface of a bore in a work piece, the tool comprising:
    a main body with a periphery;
    six cutter inserts arrayed around and supported at the periphery of the main body, the inserts each being shaped to define a respective cutting edge of the cutter insert at the main body for machining the bore surface; the cutter inserts being respectively comprised of respective different first and second materials at least in the region of the cutting edge; wherein the tool has the cutter inserts for defining six of the cutting edges.

14. The tool of claim 13, further comprising a respective guide strip supported at the periphery of the main body and associated with each one of the cutter inserts at the body; and wherein the guide strips are arranged opposite one another in pairs.

15. The tool of claim 1, wherein the at least one guide strip further comprises a third guide strip at the periphery of the main body and behind the first cutter insert in the rotational direction of the tool by about 40°.

16. The tool of claim 13, further comprising a respective guide strip supported at the periphery of the main body and associated with each one of the cutter inserts at the body.

17. The tool of claim 16, wherein one of the first of the cutter inserts is ahead of the associated guide strip by about 0.20 mm to 0.25 mm in the rotation direction of the tool.

18. The tool of claim 1, wherein the second cutter insert is ahead of the first cutter insert by about 220° in the rotational direction of the tool.

19. The tool of claim 17, wherein one of the second cutting edges is ahead of the associated guide strip by about 0.50 mm in the rotation direction of the tool.

20. The tool of claim 13, wherein four of the cutter inserts have respective second cutting edges for preliminary machining of the bore and two of the cutter inserts have respective first cutting edges for finished machining of the bore.

21. The tool of claim 20, wherein a first one of the first cutter inserts for finished machining is ahead of a second one of the second cutter inserts for preliminary machining by about 60° in the direction of rotation of the tool.

22. The tool of claim 20, wherein a third one of the cutter inserts has a respective third cutting edge for finished machining.

23. The tool of claim 20, wherein at least one of the second cutter inserts for preliminary machining is ahead of the first cutter insert for finished machining in the direction of rotation of the tool.

24. The tool of claim 20, wherein three of the second cutter inserts for preliminary machining are ahead of the first cutter insert for finished machining in the machine direction.

25. The tool of claim 20, wherein a fourth cutter insert is one of the second cutter inserts for preliminary machining and is in advance of the first cutter insert for finished machining by about 60° in the direction of rotation of the tool.

26. The tool of claim 25, wherein a fifth cutter insert is one of the second cutter inserts for preliminary machining and is ahead of the first cutter insert for finished machining by about 120° in the direction of rotation of the tool.

27. The tool of claim 26, wherein a sixth cutter insert is one of the second cutter inserts for preliminary machining and is located opposite the first cutter insert for finished machining around the body of the tool.

28. The tool of claim 13, wherein the cutter inserts are arranged in pairs of which the cutter inserts are opposite one another around the body.

29. The tool of claim 1, further comprising a supply of coolant or lubricant in the tool for supplying lubricant or coolant to the cutting edges.

30. A tool for precise machining of a surface of a bore in a work piece, the tool comprising:
   a main body with a periphery;
   a first and a second cutter insert supported at the periphery of the main body, the first and second inserts each being shaped to define at least a respective first cutting edge of the first cutter insert and a second cutting edge of the second cutter insert at the main body for machining the bore surface; the first and second cutter inserts being comprised of respective different first and second materials at least in the region of the at least one first cutting edge and second cutting edge;
   a respective guide strip in the main body for at least one of the cutter inserts; the guide strip is disposed after the associated cutter insert by about 20° in the rotational direction of the tool.

31. The tool of claim 29, further comprising outlets from the supply aimed at the cutting edges such that the coolant and lubricant are supplied at the cutting edges and the supply and the outlets are so designed and shaped that during machining by the cutting edges, the cutting edges are kept at a temperature below a target temperature to prevent damage to the cutter inserts by heating.

32. The tool of claim 31, wherein the target temperature is below 600° C.

33. The tool of claim 31, wherein the target temperature is below 400° C.–600° C.

34. The tool of claim 31, wherein the target temperature is below 450° C.–550° C.

35. The tool of claim 27, wherein the second cutter insert for preliminary machining projects by 12 µm to 15 µm below an outer surface of the associated guide strip both measured from the periphery of the body.

36. The tool of claim 35, wherein the first cutter insert projects by 9 µm to 12 µm above an outer surface of the associated guide strip above the surface of the body.

37. The tool of claim 31, wherein the target temperature is approximately in the region of 500° C. at most.

38. The tool of claim 13, further comprising a supply of coolant or lubricant in the tool for supplying lubricant or coolant to the cutting edges.

39. The tool of claim 22, wherein the first cutter insert projects by 9 µm to 12 µm above an outer surface of the associated guide strip above the surface of the body.

* * * * *